US012671933B2

(12) United States Patent
Haartsen

(10) Patent No.: US 12,671,933 B2
(45) Date of Patent: Jun. 30, 2026

(54) ENVIRONMENTAL NOISE SUPPRESSION METHOD

(71) Applicant: Dopple IP B.V, Assen (NL)

(72) Inventor: Jacobus Cornelis Haartsen, Rolde (NL)

(73) Assignee: DOPPLE IP B.V., Assen (NL)

( * ) Notice: Subject to any disclaimer, the term of this patent is extended or adjusted under 35 U.S.C. 154(b) by 247 days.

(21) Appl. No.: 18/460,627

(22) Filed: Sep. 4, 2023

(65) Prior Publication Data

US 2024/0312474 A1 Sep. 19, 2024

Related U.S. Application Data

(60) Provisional application No. 63/452,765, filed on Mar. 17, 2023.

(51) Int. Cl.

*G10L 21/0232* (2013.01)
*G10L 25/84* (2013.01)
*H04R 1/10* (2026.01)
*H04R 1/40* (2006.01)
*H04R 3/00* (2006.01)
*G10L 21/0216* (2013.01)

(52) U.S. Cl.

CPC ........ *H04R 1/1083* (2013.01); *G10L 21/0232* (2013.01); *G10L 25/84* (2013.01); *H04R 1/1041* (2013.01); *H04R 1/1075* (2013.01); *H04R 1/406* (2013.01); *H04R 3/005* (2013.01); *G10L 2021/02166* (2013.01); *H04R 2410/01* (2013.01); *H04R 2420/07* (2013.01)

(58) Field of Classification Search

None

See application file for complete search history.

(56) References Cited

U.S. PATENT DOCUMENTS

2013/0024194 A1* 1/2013 Zhao .................. G10L 21/0208 704/E21.002
2018/0268837 A1* 9/2018 Ganeshkumar ..... G10L 21/0208
2018/0336911 A1 11/2018 Dahl et al.
2020/0258539 A1* 8/2020 Shim .................... H04R 1/1083
2020/0302922 A1 9/2020 Jazi et al.
2024/0153518 A1* 5/2024 Vondersaar ............. G10L 25/78

FOREIGN PATENT DOCUMENTS

EP 2555189 A1 2/2013
WO 2022198234 A1 9/2022

* cited by examiner

*Primary Examiner* — Antim G Shah

(74) *Attorney, Agent, or Firm* — Hoyng Rokh Monegier; Benjamin D. van der Sman

(57) ABSTRACT

A voice pick-up arrangement (500) provides improved voice performance in a wireless headset (12) exposed to loud environmental noise. A air microphone (220) and a vibration sensor (230) are used for sound pickup. An adaptive filter (450) may be used to subtract the noise from the vibration sensor output in a subtractor (460), thus producing a clear voice signal. A noise level may be monitored and be used for determining whether the adaptive filter is used or for determining the coefficients of the adaptive filter (450). A beamforming array may be used to suppress a voice component of the picked-up air microphone audio signal.

18 Claims, 9 Drawing Sheets

500

600

ENVIRONMENTAL NOISE SUPPRESSION METHOD

RELATED APPLICATIONS

This application claims the benefit of provisional patent application No. 63/452,765, filed Mar. 17, 2023, which is hereby incorporated by reference in its entirety.

TECHNICAL FIELD

The present invention relates generally to audio devices, and in particular to wireless headsets, with air microphones and vibration sensors to achieve voice quality enhancement in noisy conditions. The invention relates to voice quality enhancement methods.

BACKGROUND

The use of headsets wirelessly connected to host devices like smartphones, computers, laptops, gaming consoles, smart TVs, smart watches, augmented reality (AR) systems, virtual reality (VR) systems, tablets or any device that can wirelessly connect to headsets is becoming increasingly popular. Whereas consumers used to be tethered to their electronic device with wired headsets, wireless headsets are gaining more traction due to the enhanced user experience, providing the user more freedom of movement, enhanced portability and comfort of use. Further momentum for wireless headsets has been gained by certain smartphone manufacturers abandoning the implementation of the 3.5 mm audio jack in the smartphone, and promoting voice communications and music listening wirelessly, for example by using Bluetooth® technology.

In many environments, people are exposed to loud noises. For example, people visit music festivals where the sound levels are typically above the level where hearing damage may occur. Factory workers, construction builders, and professionals working in the music industry are frequently exposed to loud sound levels. The examples also include environments such as airplanes, offices, public transportations, and sports arenas. More and more people are wearing ear plugs to reduce the sound level arriving at their ear drums, and thus to achieve a desired sound level including avoiding hearing loss which typically results from exposure to loud sound levels for a longer duration of time.

Passive ear plugs are widely used as hearing protection device providing noise reduction by physically blocking sound from entering the ear canal. The problem with the passive ear plugs is that communication is impossible because the ear canal is blocked. As a result, many people remove their hearing protecting ear plugs when they wish to communicate, be it via a (smart)phone or directly orally to a person nearby. Combining the technology used in wireless headsets with hearing protection measures is one way to solve the communication problem in loud environments. For professionals working in loud environments, the combination of wireless headsets and hearing protection measures improves the quality of life of professionals because in addition for communications, they may use their headset to listen to their favorite music or podcast while working.

Wireless headsets typically have one or more air microphones to pick up the voice of the user. Air microphones pick up airborne acoustic waves and convert them into electrical signals. By using one or more air microphones, voice can be detected and captured. Once captured and converted into electrical signals the voice signals can be processed and/or analyzed. However, the air microphones (MIC) may pick up the loud environmental noise as well. If the noise level is high and dominates the audio signal that is picked up, the voice may not be audible.

For picking up voice more efficiently, a vibration sensor may be applied to pick up the voice. Vibration sensors may pick up the mechanical vibrations in the human skull caused by the vocal cords. Vibrations can be picked up via the skin (Skin Surface Microphones), from the bones (Bone Conduction microphone), or from other tissues in the user's head. The vibration sensor can for example be implemented by an accelerometer which may use MEMS technology. However, the vibration sensors cannot completely suppress the environmental noise. In addition to bone vibrations, it will also be sensitive to vibrations caused by the air waves from the noise which act upon the housing of the headset. Many vibration sensors have a high-frequency transfer function in order to compensate for the low-pass filtering of the voice signal caused by audio waves traversing through the human bone and tissue. As a result, high frequencies are emphasized to equalize the low-passed voice signal. Yet, the high-pass filtering becomes quite noticeable for the loud environmental noise that reaches the vibration sensor. Therefore, even a vibration sensor may perform poorly when picking up the voice signal in the presence of loud noise. Wireless headsets with improved voice pick-up performance in loud environmental noise conditions are therefore desirable.

The Background section of this document is provided to place embodiments of the present invention in technological and operational context to assist those of skill in the art in understanding their scope and utility. Unless explicitly identified as such, no statement herein is admitted being prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

The term "air microphone", or "microphone" not used in a context of using a condensed medium, used in this document may mainly relate to the devices that detect audio signals travelling through gaseous medium such as air.

The term "vibration sensor" used in this document may mainly relate to the sensor devices that detect audio signals travelling through condensed medium such as solid, liquid, human tissue, human bones, etc.

The term "headset" used in this document includes earphones, headphones, earbuds, earplugs and any audio device which can be worn over or inside the ears to facilitate audio communication.

The term "voice pickup" refers to a process for capturing the voice in an audio signal, including enhancing the clarity and intelligibility of the voice within the audio signal. Sounds will be picked-up by air microphone or vibration sensors of a headset. Sounds will contain voice and other sounds, referred to as noise. Noise includes environmental noise or background noise. Voice pickup may be improved by suppressing the noise within the electrical audio signal.

A first aspect of the present invention relates to a method of improving voice pickup in a headset. The method of the first aspect may comprise a step of picking up sounds using one or more vibration sensors. Vibration sensors in headsets will detect vibration signals generated by the vocal cords propagating through the bones and muscles of a user. The one or more vibration sensors will process the picked-up sounds into a vibration sensor audio signal. Sounds picked up by the one or more vibration sensors may be processed and converted into electrical audio signals. The processing in the vibration sensor may further include echo cancellation, noise suppression, automatic gain control, voice activity detection, personal voice recognition, or any type of processing suitable for voice pickup. The processing may be applied to various properties of picked-up sounds such as amplitude, frequency, timbre, phase, and envelop. The vibration sensors in headsets are designed to capture vibration signals coming from vocal cords propagating inside the user's body. Vibrations sensors are less sensitive to other sounds/noise.

The method of the first aspect may further include the step of picking up sounds using one or more air microphones. Having multiple air microphones in a headset may be beneficial for realizing advanced audio processing techniques such as Enhanced Voice Pickup, Noise Suppression (NS), Active Noise Cancellation (ANC), spatial audio, and 3D sound.

The method of the first aspect may further include the step of processing sounds picked up by the one or more air microphones into a processed air microphone audio signal. The audio signal is the electrical output of the one or more air microphones. The processing may be any technique which can be used to pick-up sounds and create a suitable electrical audio signal. The processing may be applied to various properties of picked-up sounds such as amplitude, frequency, timbre, phase, and envelop.

Embodiments of the invention relate to methods and devices for reducing noise in the obtained output audio signal by enhancing the signal-to-noise ratio (SNR) of the voice that is picked up, wherein the voice signal is the desired signal of the SNR.

Embodiments of the method may further include the step of generating an output audio signal by combining the air microphone audio signal and the vibration sensor audio signal. Air microphones detect sound waves travelling in the air by converting the pressure variations of sound waves into electrical signals. In a noisy environment, air microphones will collect audio signals that have low SNR. As a result, the processed air microphone audio signal may predominantly contain noise signal. A vibration sensor may collect audio signals which have higher SNR than the air microphone. By combining the audio signals captured by different sources, the resultant output audio signal can have higher SNR than the SNR of the audio signal picked-up by the vibration sensor.

Combining of audio signals refers to any mathematical (addition, subtraction, linear combination, multiplication, integration, etc.) combination of properties of respective electrical audio signals. Preferably combining of audio signals refers to addition or subtraction of amplitudes of the audio signal. The audio output will have a duration corresponding to a certain duration of live sounds. The combined air microphone and vibration sensor audio signals span the same duration live sounds and have been captured at generally the same time and location.

Preferably the combining is embodied by subtracting the air microphone audio signal and the vibration sensor audio signal. to obtain a subtracted audio output audio signal. The subtraction may be carried out by using a subtractor. The subtracting step surprisingly results in reducing the noise portion of the processed vibration sensor audio signal. In this noisy environment, the low SNR signal of air microphone may be used to suppress the noise in the vibration sensor signal. As a result, the audio output audio signal has higher SNR.

In embodiments, the method of the first aspect may comprise the step of adjusting any of the properties of the audio signals that are input to the subtractor, preferably of the air microphone audio signal, and most preferably the amplitude of the audio signal, using an adaptive filter. An adaptive filter may adjust, by amplification (amplification is being used here to not only refer to an increase in signal but also a decrease, e.g. an amplification value between 0 and 1) the air microphone audio signal so that subsequent subtraction using that adjusted air microphone audio signal results in a higher SNR in the output audio signal.

In embodiments, the method of the first aspect may further comprise configuring, e.g. weighing, the adaptive filter based on the subtracted output audio signal, preferably on the SNR of the subtracted output audio signal. The method can be implemented by a feedback control loop by connecting the subtracted output audio signal to the adaptive filter for controlling the processed air microphone audio signal. In embodiments, increasing or decreasing the amplitude of the air microphone audio signal that is subtracted from the vibration sensor audio signal results in more or less SNR in the resultant subtracted output audio signal and the adaptive filter is adapted according to increase the SNR. This allows optimizing the subsequent subtraction based on the "live" output audio signals.

In embodiments, the adaptive filter allows different filter settings for different frequency bands. Each filter setting can be determined individually based on a frequency band in the output audio signal.

In embodiments, the method of the first aspect may further comprise a step of monitoring a noise level in any of the audio signals. The noise level in the audio signal will be dependent on the (environmental and/or background) noise in the sounds picked up by the headset. The SNR of voice in the audio signals will decrease if noise increases. The noise can vary and is dependent e.g. on where the user is and moves to during use of a headset. By continuously monitoring the noise level in the audio signals, further method steps can be carried out.

In embodiments, when the monitored noise level is high, the method of the first aspect includes outputting the subtracted output audio signal. When the noise level decreases, a second output audio signal is provided by, preferably linearly, combining the subtracted output audio signal with the air microphone audio signal and/or the vibration sensor audio signal. When the noise level decreases, the amount of subtracted output audio signal in the second output audio signal decreases. At low noise levels, the second output audio signal predominantly comprises the vibration sensor audio signal and/or the air microphone audio signal. In a low noise environment, the vibration sensor audio signal and the air microphone audio signal may both have a relatively high SNR. By linearly combining the subtracted output audio signal with the vibration sensor/air microphone audio signal into the second output audio signal, that second output audio signal will have good SNR at any noise level. When the noise level changes, the second output audio signal will transition to a linear combination of the subtracted output audio signal and the vibration sensor/air microphone audio signal. When the noise level varies smoothly, the change in the linear combination of the second output audio signal will transition similarly smoothly.

In embodiments, combining the subtracted output audio signal with the vibration sensor/air microphone audio signals may be carried out by using a combiner. The combiner can create a linear combination. Preferably a normalized linear combination is made. In preferred embodiments, the combiner may be configured to generate an output depending on the monitored noise level, wherein weight factors may be applied when combining the subtracted output audio signal and the processed vibration sensor audio signal and/or the processed air microphone audio signal, wherein the weight factors are dependent on the monitored noise level.

In embodiments, the monitoring of the noise level may use spectral analysis for determining the measured noise level. This allows analyzing audio signals in the frequency domain for identifying noise sources using the spectral characteristics of different noise sources and/or particular frequency behaviors (e.g., harmonics).

Monitoring the noise level allows determining changes in noise level and embodiments of the method can implement changes in subtracting the air microphone audio signal from the vibration sensor audio signal and/or changes in the combining of subtracted output audio signal and the air microphone/vibration sensor audio signal. In an embodiments, when the noise level is low such that the air microphone audio signal contains a strong voice component, the final output may not contain the subtracted output audio signal but only the air microphone audio signal or the vibration sensor audio signal.

In embodiments, the combination of vibration sensor audio signals may use voice detection for combining the subtracted output audio signal and the air microphone/vibration sensor audio signals. The voice detection may include spectral analysis of audio signals for detecting a voice component.

In embodiments, the method of the first aspect may further comprises the step of wirelessly sending the vibration sensor audio signal and/or the air microphone audio signal from a first wireless headset, preferably via a host device, to a second wireless headset, wherein the remaining steps (e.g., generating step) of the methods are carried out. In alternative embodiments, the method of the first aspect may further comprises the step of wireless sending the vibration sensor audio signal and/or the air microphone audio signal from a first wireless headset to a host device (e.g., a smartphone), wherein the remaining steps (e.g. generating step) of the methods are carried out.

A second aspect of the present invention relates to a headset comprising, one or more vibration sensors, and one or more air microphones and a subtractor for audio signals obtained with the one or more vibration sensors and the one or more air microphones.

The one or more vibration sensors are arranged to pick-up sounds and to convert the sounds into a vibration sensor audio signal. The one or more vibration sensor can have processors for processing the audio signal. The vibration audio signal is fed to the subtractor. The one or more air microphones are arranged to pick-up sounds and to convert the sounds into a air microphone audio signal. The one or more air microphones can have processors for processing the air microphone audio signal. The air microphone signal is fed to the subtractor.

According to embodiments of the invention, the subtractor is arranged to receive the vibration audio signal and the air microphone audio signal. The subtractor is arranged to subtract the air microphone audio signal from the vibration audio signal. The subtractor is arranged to obtain a subtracted output audio signal. The vibration audio signal will have, in high noise environments, have a relative high SNR for the voice in the picked-up sounds. The air microphone audio signal has low SNR with respect to the voice in the picked up sounds. Subtracting the air microphone audio signal from the vibration audio signal will reduce the noise present in the vibration audio signal even further, thereby increasing the SNR with respect to voice.

In embodiments, the headset may be a wireless headset. In embodiments, the headset may be earphones, headphones, earbuds, earplugs and any audio device which can be worn over or inside the ears to facilitate audio communication. The headset can comprise a microprocessor configured to process audio signals.

In embodiments, the headset may be configured to carry out the methods of the first aspect. One skilled in the art would appreciate that more hardware components may be used for carrying out the steps of the methods of the first aspect. These hardware components may include antenna, audio codec, Digital-to-Analog (D/A) converter, speaker, radio transceiver, Digital Signal Processor (DSP), Tensilica processor, digital microphones, Power Management Unit (PMU), battery, and any component suitable for carrying out the methods of the present invention.

In embodiments, the headset further comprises a adaptive filter. The adaptive filter is arranged to filter the air microphone audio signal. Filtering can encompass amplification (including amplification factors between 0 and 1), preferably of the amplitude of the air microphone audio signal. The output of the one or more air microphone is fed to the subtractor. In embodiments the adaptive filter is also connected to the output of the subtractor. By providing the subtracted output audio signal to the adaptive filter, a feedback loop is created, wherein the adaptive filtering of the air microphone audio signal that is fed to the subtractor is based on the subtracted output audio signal. The adaptive filter can be set to increase the SNR in the subtracted output audio signal. In embodiments that adaptive filter is set to bring the level of the noise (=non-voice signal in the audio signal) in the air microphone audio signal to a similar level as the noise in the vibration sensor audio signal. By subsequently subtracting the adaptively filtered air microphone audio signal from the vibration sensor audio signal, the noise present in the vibration sensor audio signal is further reduced, increasing the SNR.

In embodiments the headset further comprises a combiner. The combiner is arranged to combine the subtracted output audio signal with the vibration sensor audio signal and/or with the air microphone audio signal. Preferably the combiner is arranged to linearly combine the two signals. The combiner allows combining the subtracted output audio signal with one of the original audio signals.

In embodiments the headset further comprises a noise level sensor arranged to obtain a noise level signal. The noise level sensor allows determining whether the headset is being used in a noisy environment or in a low noise environment. In case of a low noise environment, the headset can be configured to output the vibration sensor audio signal or the air microphone audio signal as the output for further reproduction. In case of low noise, the SNR of the vibration sensor audio signal and/or the air microphone audio signal is high enough for high quality reproduction of voice signals. Switching to a 100% vibration sensor audio signal or air microphone audio signal can be implemented by the combiner that sets weighing of the subtracted output audio signal to zero and weighing of the vibration sensor audio signal or air microphone audio signal to 100%. In that manner the second audio output signal of the combiner will be one of the original picked up audio signals.

In embodiments, the combiner is arranged to combine the subtracted output audio signal with the vibration sensor audio signal and/or air microphone audio signal dependent on the noise level signal. In case of increasing noise, the combiner can increase the weight of the subtracted output audio signal in the second output audio signal. In case of decreasing noise, the combiner can lower the weight of the subtracted output audio signal in the second output audio signal. In this manner a gradual transition between subtracted output audio signal and one of the original audio signals, dependent on the noise level in the picked-up sounds, can be obtained.

In embodiments, a voice activity or noise level detection circuit may be used to gradually switch the voice audio path from a voice audio path wherein the noise is suppressed by the adaptive filter to a voice audio path directly originating from the air microphone(s) and/or vibration sensor(s) depending on the noise level.

By exploiting the low signal-to-noise conditions on the air microphone(s), the noise can be suppressed in the vibration sensor signal using an adaptive filter and a subtractor. In high signal-to-noise conditions, the voice signal can be picked up directly from the air microphone and/or vibration sensor without the use of the adaptive filter. A voice activity or noise level detection circuit can be used to gradually switch from a voice audio path where noise is suppressed by an adaptive filter to a voice audio path directly originating from the air microphone and/or vibration sensor when the noise level is diminishing.

The above and the following present a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

BRIEF DESCRIPTION OF DRAWINGS

The present invention will now be described more fully hereinafter with reference to the accompanying drawings, showing several embodiments of the invention. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. Embodiments will be described, by way of example only, with reference to the accompanying schematic drawings in which corresponding reference symbols indicate corresponding parts, and in which.

DESCRIPTION OF EMBODIMENTS

Figure 1:
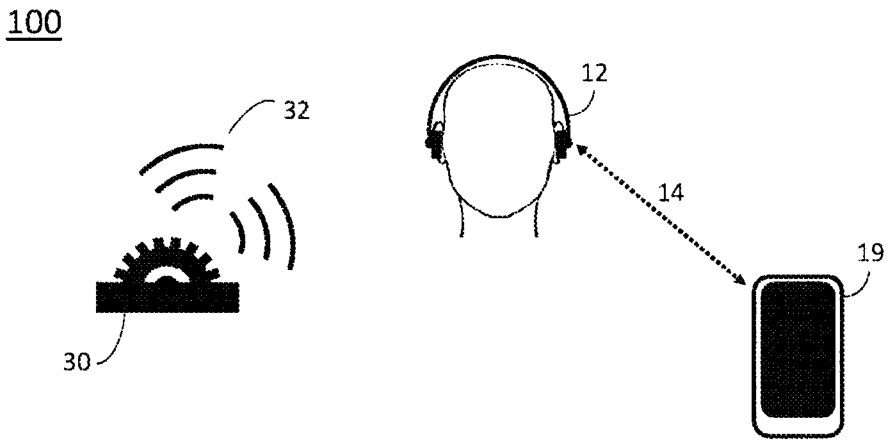
FIG. 1 shows an exemplary use scenario of a user located in an area with a high level of environmental sound wearing a wireless stereo headset and wirelessly communicating with a host device.

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Electronic devices, such as mobile phones and smartphones, are in widespread use throughout the world. Although the mobile phone was initially developed for providing wireless voice communications, its capabilities have been increased tremendously. Modern mobile phones can access the worldwide web, store a large amount of video and music content, include numerous applications ("apps") that enhance the phone's capabilities (often taking advantage of additional electronics, such as still and video cameras, satellite positioning receivers, inertial sensors, and the like), and provide an interface for social networking. Many smartphones feature a large screen with touch capabilities for easy user interaction. In interacting with modern smartphones, wearable headsets are often preferred for enjoying private audio, for example voice communications, music listening, or watching video, thus not interfering with or disturbing other people sharing the same area. Because it represents such a major use case, embodiments of the present invention are described herein with reference to a smartphone, or simply "phone" as the host device. However, those of skill in the art will readily recognize that embodiments described herein are not limited to mobile phones, but in general apply to any electronic device capable of providing audio content.

Hearing loss used to be a human defect connected with aging. Yet, today many people, including the young, are experiencing hearing problems like hearing loss and tinnitus caused by be exposure to high sound levels for longer duration of time. Youngsters are visiting music festivals where sound levels are above the safe threshold for avoiding hearing loss. But also professionals are frequently working in environments where they are exposed to loud noises for longer durations of time. People working in factories with loud machines, construction builders, and even truck drivers driving in their cabins for long hours are likely to develop problems with hearing. More and more people purchase hearing protection devices like ear plugs that can be placed inside the ear canal and suppress most of the environmental noise. The problem with these ear plugs is that it isolates the user from its environment, thus preventing him to communicate efficiently. As a result, people take out their ear plugs when they need to communicate, thus jeopardizing their hearing capabilities.

FIG. 1 depicts a typical use scenario 100, of a worker in a workshop where a loud sawing machine 30 is present producing high levels of sound 32. The worker wears a headset which is wirelessly connected to a host device 19, such as a smartphone. The host contains audio content which can stream over wireless connection 14 towards the headset 12. Headset 12 also has communication capabilities to make a hands-free phone call via host device 19. Headset 12 can be a mono device consisting of one unit, or it can be a stereo device consisting of two ear pieces, either separate or connected via a string.

Figure 2:
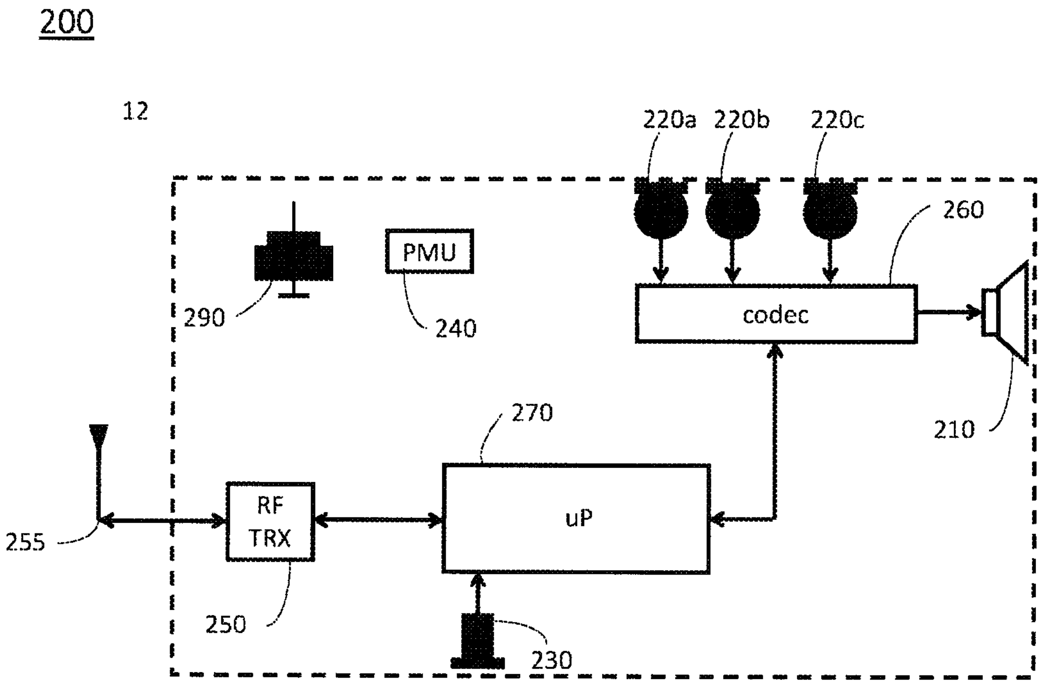
FIG. 2 is a block diagram of an exemplary wireless stereo headset with a vibration sensor and one or more air microphones.

FIG. 2 depicts a high-level block diagram 200 of an exemplary wireless headset 12 consistent with embodiments of the present invention. Only a wireless mono headset is shown, but it will be readily apparent to one of ordinary skill in the art that the invention can also be used in a wireless stereo headset, including True Wireless headsets making use of two separate ear pieces each having a radio connection to the phone 19 (shown in FIG. 1). Wireless communication between the phone 19 (or any other host device) and the headset 12 is provided by an antenna 255 and a radio transceiver (RF-TRX) 250. Radio transceivers 250 is a low-power radio transceiver covering short distances, for example a radio based on the Bluetooth® wireless standard operating in the 2.4 GHz ISM band. The use of the radio transceiver 250, which by definition provides two-way communication capability, allows for efficient use of airtime (and consequently low power consumption) because it enables the use of a digital modulation scheme with a time slotted transmission and reception, and an automatic repeat request (ARQ) protocol.

A microprocessor 270 may control the radio signals, applying audio processing (for example voice processing such as echo cancellation or noise suppression) on the signals exchanged with radio transceiver 250, or may control other devices and/or signal paths within the headset 12. Microprocessor 270 may be a separate circuit, or may be integrated into another component present in the headset, for example radio transceiver 250. Microprocessor 270 may include a dedicated Digital Signal Processor (DSP), for example one based on a Tensilica processor.

Audio codec 260, connected to the microprocessor 270, includes a Digital-to-Analog (D/A) converter, the output of which may connect to a speaker 210. One or more air microphones 220 may be added to pick up airborne acoustic waves, for example emanating from the voice of the headset user. To support different audio functions like Enhanced Voice Pickup, Noise Suppression (NS) and Active Noise Cancellation (ANC), more than one air microphone 220 may be embedded in headset 12.

For example, two or more air microphones 220*a* and 220*b* may be located at the outside of the ear piece to form an array allowing beam-forming (BF) for enhanced voice pickup. A third air microphone 220*c* may be located inside the ear piece in front of the speaker to allow audio feedback in an ANC application. Audio codec 260 may include Analog-to-Digital (A/D) converters that receive analog input signals from air microphones 220*a*, 220*b*, and 220*c* and convert them into digital audio signals. Codec 260 collects the picked-up sounds and provides one or more digital microphone audio signal(s) to the microprocessor 270. Alternatively, digital air microphones may be used, which do not require A/D conversion and may provide digital audio signals directly to the audio codec 260 or to the microprocessor 270.

Tubes (not shown) in the housing of headset 12 may serve as air channels to feed the outside airborne acoustic waves towards the air microphones 220.

One or more vibration sensors may be connected to the microprocessor 270. The vibration sensor picks up the sounds and provides a digital vibration sensor audio signal to the microprocessor 270. The vibration sensor is not exposed to the outside air, but is located in the housing of headset 12 for optimal pickup of the headset user's voice arriving at headset 12 through bone conduction and/or through skin.

A digital interface may be provided between vibration sensor 230 and microprocessor 270. If the interface is analog, the output of the vibration sensor 230 may need to be connected to the codec 260 for A/D conversion.

Power Management Unit (PMU) 240 may provide a stable voltage and current supplied to all electronic circuitry. The headset 12 may be powered by a battery 290 which typically provides a 3.7V voltage and may be of the coin cell type. The battery 290 can be a primary battery but is preferably a rechargeable battery. Recharging circuitry may be included in the PMU 240.

Many other components, like sensors, may be added to headset 12 but are not shown since they do not affect the invention presented.

Figure 3:
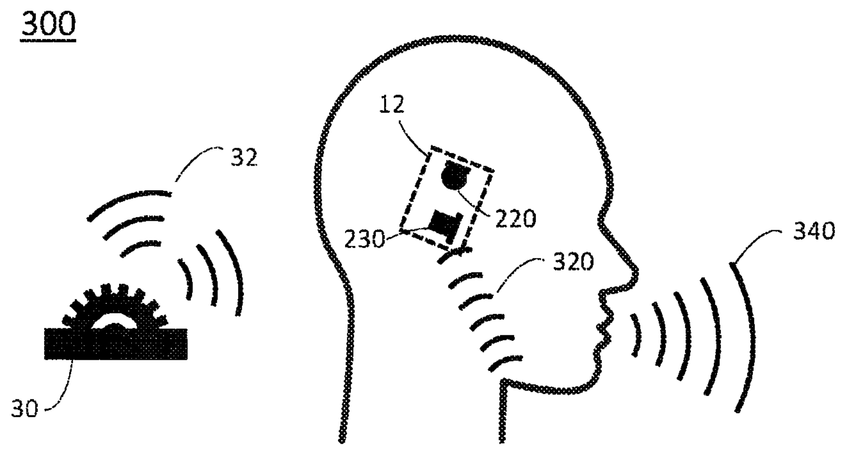
FIG. 3 shows the different acoustic paths the voice and a loud machine may take to arrive at the vibration sensor and the air microphone.

FIG. 3 depicts the possible acoustic paths the different audio sources may take to reach the air microphones 220 and the vibration sensor 230. In the application 'sounds' refers to any combination of acoustic sources. Sounds can include voice and other sounds, generally referred to as noise. Acoustic paths may be airborne, or may use the human bones and/or skin of the headset user as transport medium.

Airwaves 32 emanating from the sawing machine 30 excite both the air microphone 220 and the vibration sensor 230. Airwaves 340 emanating from the user's mouth excite both the air microphone 220 and the vibration sensor 230. Acoustic waves 320 generated by the user's vocal cords traversing human bone and skin mainly excite the vibration sensor 230. It will be clear that the air microphone 220 and vibration sensor 230 may pick up acoustic signals emanated by the user's vocal cords and emanated by the interfering machine 30. Airborne acoustic waves may impinge on the headset housing, thus impacting the vibration sensor 230. Vibration sensor 230 thus may not only pickup the user's voice through bone conduction. As a result, in loud environments where the sound waves 32 reach high levels, the voice pickup by either the air microphone 220 and/or the vibration sensor 230 may be challenged.

In a very loud environment, the Signal-to-Noise (SNR) ratio—where the intended signal is the voice signal and the noise is for example the sound 32 from the sawing machine 30—is very low on the air microphone 220, i.e. the noise is dominant in the air microphone signal. In the vibration sensor output audio signal, the SNR may be low as well, but probably not as low as in the air microphone signal.

Figure 4:
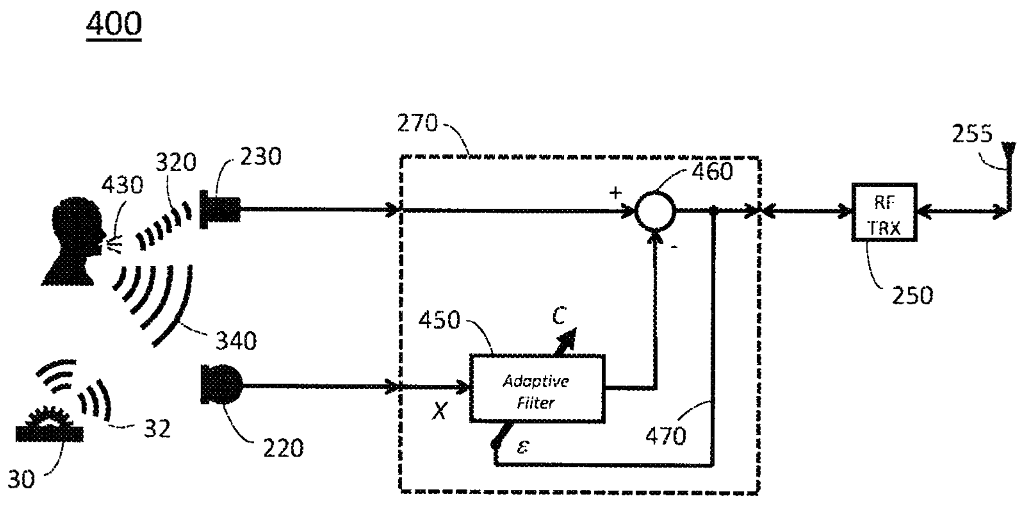
FIG. 4 is a first block diagram using an adaptive filter to suppress environmental noise according to a first embodiment.

A circuit arrangement can be built that allows to subtract the noise signal from the vibration sensor output. A microprocessor 270 can be arranged to subtract the signals or a dedicated subtractor 460 can be provided. Subtracting the air microphone audio signal from the vibration sensor audio signal will further improve the SNR in the signal from the vibration sensor 230. Such an arrangement 400 is shown in FIG. 4.

The output of the subtractor 460 is also provided to the radio transceiver 250 which will carry the signal wirelessly to the host device 19 over the radio link 14.

The voice acoustic signals arrive at the vibration sensor 230 both via bone conduction 320 and via the air 340. The air waves 340 carrying the voice also arrive at the air microphone 220. Air waves 32 carrying the loud machine noise arrive both at the vibration sensor 230 and the air microphone 220.

Possibly, a codec(s) 260 is (are) present (not shown in FIG. 4) to provide digital signals to the microprocessor 270.

In the microprocessor 270 an adaptive filter arrangement 450 can be made. In embodiments a dedicated adaptive filter 450 can be present to create a suitable signal that can be subtracted from the vibration sensor audio signal in a subtractor 460.

In embodiments, the output of the subtractor, the output audio signal 470, is used to control the coefficients of adaptive filter 450, thus changing the filter's transfer function.

The adaptive filter 450 can be a Finite Impulse Response (FIR) filter whose filter coefficients are calculated based on the subtractor (460) output using a Least Mean Square (LMS) algorithm as described in the article "Adaptive Noise Cancelling: Principles and Applications," by B. Widrow et al, published in Proceedings of the IEEE, Vol. 63, No. 12, December 1975. To allow for variations in noise levels, a Normalized Least Mean Square (NLMS) algorithm can be applied. These type of adaptive filters are common practice in echo cancellers applied in all kinds of audio communication products (including the headset 12 as shown in FIG. 1 for echo cancellation). Other types of adaptive filters that provide suitable transfer functions to subtract the noise signal from the vibration sensor signal may be applied as well.

The arrangement 400 shown in FIG. 4 performs well at low SNR conditions at the air microphone 220 i.e. when the level of noise signal 32 is well above the level of the voice signal 340. However, if the noise is less pronounced, the adaptive filter arrangement shown in FIG. 4 will also subtract the voice sounds picked up in air microphone 220 from the vibration sensor audio signal. The adaptive filter 450 will adapt to the voice signal as well. In that case, the voice sound at the output of subtractor 460 is distorted and sounds pinched off. In case of low noise (high SNR levels), the arrangement 400 should switch to provide the audio signal directly provided by the air microphone 220 or by the vibration sensor 230.

Figure 5:
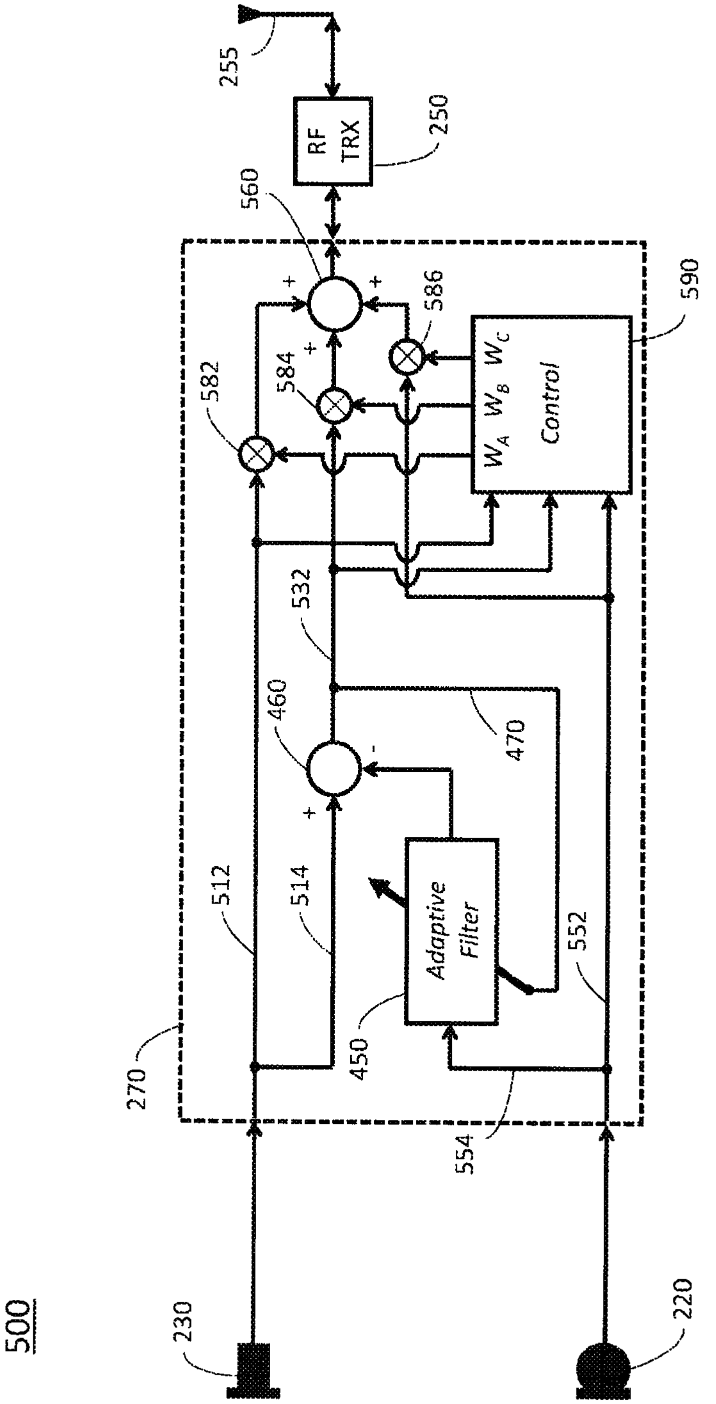
FIG. 5 is a second block diagram using an adaptive filter to suppress environmental noise according to a first embodiment.

An arrangement 500 that can operate both in low SNR and high SNR conditions is shown in FIG. 5. The vibration sensor audio signal of vibration sensor 230 is fed both into the subtractor 460 via connection 514 and into a multiplier 582 via connection 512. In the same fashion the air microphone audio signal of air microphone 220 is fed to the adaptive filter 450 via connection 554 and into a multiplier 586 via connection 552. The subtracted output audio signal of the subtractor 460 is fed into a multiplier 584 via connection 532.

In the multipliers 582, 584, and 586, the received signals are multiplied with a certain weight $W_A$, $W_B$, and $W_C$, respectively. Multiplier outputs are subsequently added together in adder 560. Adder 560 and multiplier 582, 584, 586 operate as a linear combiner.

The weight levels are determined in control circuitry 590 which uses as input the audio signals on 512, 532, and 552 from the vibration sensor 230, the subtractor 460, and the air microphone 220, respectively. In embodiments the subtracted output audio signal 532 is combined with at least one of the audio signals of the vibration sensor 230 or the air microphone 220. Under low SNR conditions on the air microphone 220, most weight is placed on the subtractor output, i.e. the signal on 532 (large $W_B$, small $W_A$ and/or small $W_C$). Under high SNR conditions, little or no weight is placed on the subtractor output 532. In that circumstance, most weight is placed on the vibration sensor output 512 and/or air microphone output 552. Combining the output of the vibration sensor 230 and the air microphone 220 may be beneficial to restore some of the voice high-frequency content not present in the vibration sensor (due to the low-pass filtering caused by the human bone and tissue).

Figure 6:
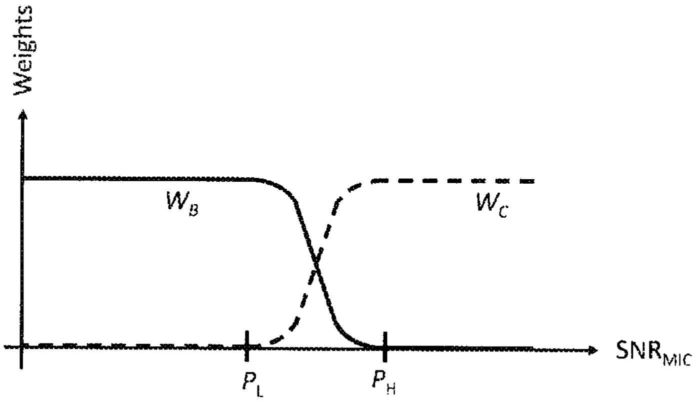
FIG. 6 shows an example of the weight factors applied to the output of the adaptive filter and output of the air microphone as a function of the signal-to-noise ratio detected at the air microphone output.

An example of the variation in the weights W as the SNR varies is shown in FIG. 6. In this case, it was assume that only the output of the subtractor 460 and the output of the air microphone 220 are controlled by circuitry 590 and added in adder 560. The weighting values $W_B$ and $W_C$ depend on the measured SNR. Below the lower threshold $P_L$, the noise is dominant and the entire output is derived from the subtractor 460 output: $W_B=1$ and $W_C=0$. If the SNR is higher than the upper threshold $P_H$, the entire output is derived from the air microphone output: $W_B=0$ and $W_C=1$. Between $P_L$ and $P_H$, $W_B$ gradually drops and $W_C$ gradually rises as the SNR improves. The exact functions may depend on the implementation and preferably the data points are put in a look-up table.

When the SNR on the MIC 220 is high, the adaptive filter 450 may adapt to the headset user's voice rather than to the environmental noise. As a result, a voice signal component may be subtracted from the voice, which is experienced as a pinched-off voice. To prevent this from happening, the adaptive filter 450 may only adapt when the SNR level is low and the acoustic signal on the MIC 220 is predominantly environmental noise. If the SNR level rises above a level where the voice, not the noise, becomes dominant, the adaptive filter 450 may stop updating its filter coefficients. Instead, it may freeze the coefficients and use them also when the SNR level further rises.

Figure 7:
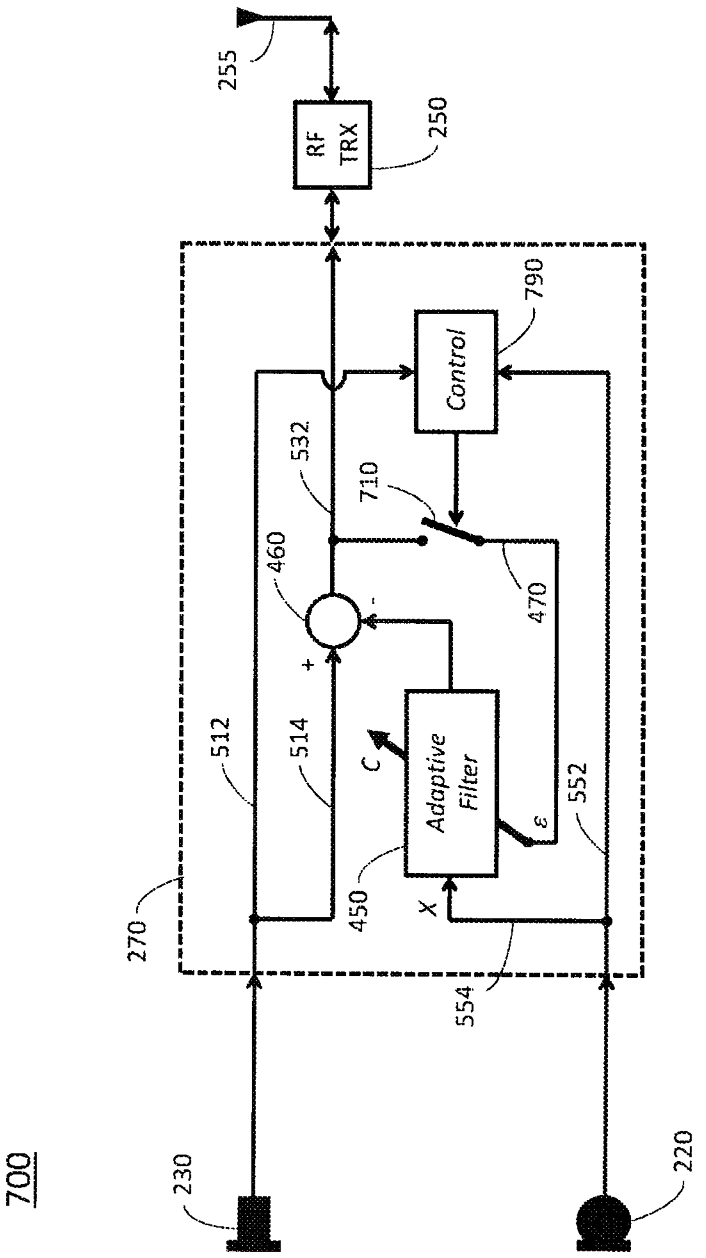
FIG. 7 shows a third block diagram using an adaptive filter to suppress environmental noise according to the first and second aspects.

An arrangement 700 that controls the updates of the filter coefficients is shown in FIG. 7. Control unit 790 monitors the MIC 220 audio signal 552 and possibly also the vibration sensor 230 audio signal 512. When predominantly noise is present, control unit 790 may close the switch 710 such that the filter coefficients in adaptive filter 450 are updated. However, if the noise is not dominant anymore, switch 710 may be opened and the filter coefficients may not be updated. Instead the filter coefficients as last updated may be used. Instead of a hard switch, one may configure the filter coefficients by changing the update rate of the filter coefficients of the adaptive filter 450. As described in the above mentioned article of Widrow, the Widrow-Hoff LMS (Least-Mean-Square) algorithm can be used to update the coefficients. If C(j) is a vector representing the M filter coefficients at time j and X(j) is a vector representing the M latest audio samples in signal 554 from the air microphone 220, a new set of M filter coefficients at time j+1 can be found with:

$$C(j+1)=C(j)+2\times\mu\times\varepsilon(j)\times X(j) \quad \text{(equation 1)}$$

where c is a convergence parameter and ε is the error signal, which may be the output 470 of the subtractor 460. The convergence parameter u determines how quickly the filter coefficients will be updated. If μ is too small, the filter 450 will only adapt very slowly; when μ is too large, the system may become unstable and may never converge to the proper filter coefficients. By opening the switch, one may set μ to zero, in which case C(j+1)=C(j) and the filter coefficients are frozen to their latest value. However, one could also make a more gradual control, where the convergence parameter μ is inversely proportional to the SNR level at MIC 220.

Alternatively, one may use the energy Ex(j) in X(j) to control the convergence parameter u. In case of the Normalized LMS Widrow-Hoff algorithm, the update is normalized by the energy in latest M audio samples from the air microphone 220, changing equation 1 into:

$$C(j+1)=C(j)+2\times\mu\times\varepsilon(j)\times X(j)/Ex(j) \quad \text{(equation 2)}$$

where $$Ex(j)=\Sigma_{k=j-M+1}^{j}[x(k)]^2 \quad \text{(equation 3)}$$

Ex(j) is a representation of the signal strength of the air microphone 220 over the last M audio samples. x(k) is the signal strength at time k. If Ex(j) is large, there is a lot of environmental noise and the coefficients C(j) may be updated; if Ex(j) is small, there is little environmental noise and the coefficients C(j) may not be updated. By setting a threshold TH on Ex(j) above which the coefficients are updated, a proper control under different SNR conditions may be achieved. In the simplest form the condition can be defined as:

μ=1, if Ex(j)>TH

μ=0, otherwise.

Compared to the noise suppression arrangement 500 in FIG. 5, the noise suppression arrangement 700 in FIG. 7, operates better in environments where there is a suddenly loud noise like car honking. In the arrangement of 500, the filter 450 will need some time to adapt to the new circumstances. In the arrangement of 700, the loud honk signals are directly cancelled since the filter settings of loud noise are used instantaneously.

When the headset is taken off (and/or turned off), the filter coefficients C should be stored in non-volatile memory. When the headset is turned on and/or placed on the ear of the user, the adaptive filter 450 can use the stored coefficients C as initial setting. This will speed up the convergence when the user directly enters an area with loud environmental noise.

Figure 8:
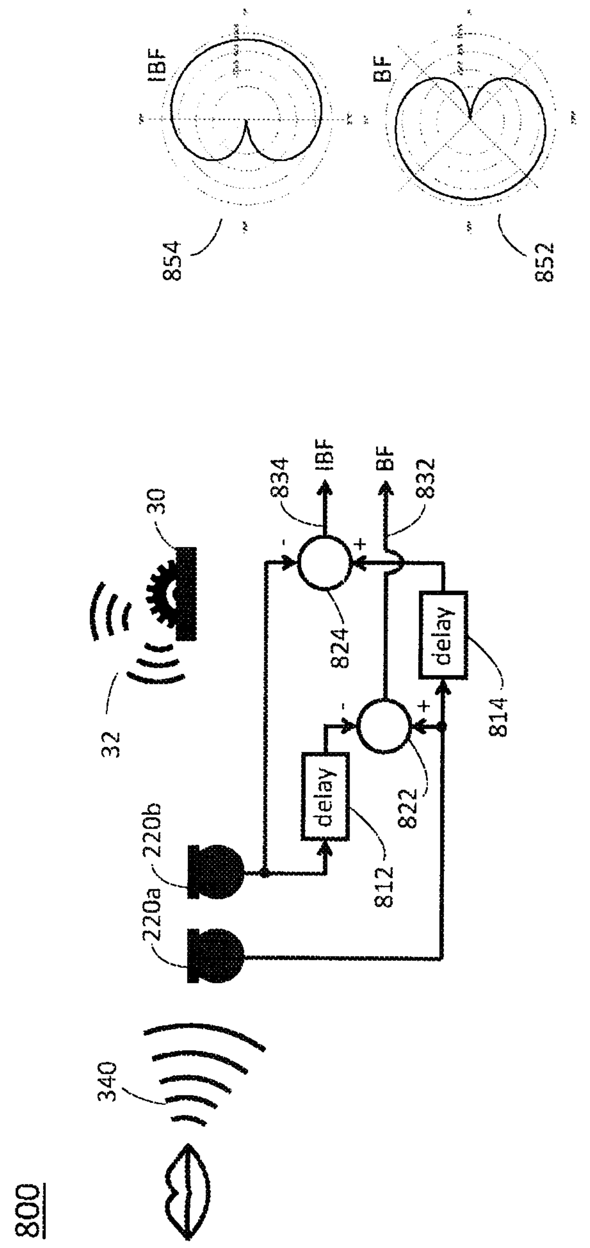
FIG. 8 shows a beam-former configuration that may be used in the first and second aspects.

Preferably, the MIC 220 should pick up as little voice from the voice airwaves 340 as possible. If the MIC 220 only mostly picks up the environmental noise airwaves 32, the adaptive filter in the arrangement 400 will be able to adapt to the noise only and subtract it from the signal picked up in the vibration sensor 230 irrespective of the SNR in the vibration sensor. One way of reducing the voice pickup by the MIC 220 is by applying beam forming. Beam forming in headsets is usually provided to improve voice pickup by applying two air microphones 220*a* and 220*b* to form an (end-fire) array, see FIG. 8. A beam-forming configuration in combination with a vibration sensor for use in wind conditions is described in U.S. Pat. No. 11,363,367B1 granted Jun. 14, 2022, which is hereby incorporated by reference in its entirety. By delaying one MIC output and subsequently subtracting the two MIC outputs from each other, we get a gain in one direction and a null in the opposite direction. In FIG. 8. MIC 220*a* is closest to the user's mouth and MIC 220*b* is a little more distant. For the beam-forming (BF) configuration, the signal from MIC 220*b* is delayed in unit 812. The delay in 812 should correspond to the time it takes for sound to travel from MIC 220*b* to MIC 220*a*. If we then subtract the delayed audio signal at MIC 220*b* from the audio signal at MIC 220*a*, we get a null since the audio signals cancel each other. Sound from the opposite direction (from the mouth) is not cancelled and a relative gain results. A logarithmic gain response of the dual-microphone arrangement depending on the direction angle 852 is shown in FIG. 8.

For the noise suppression arrangements 500 or 700, we may use the opposite concept and create a null in the direction of the mouth. This can simply be achieved with the same air microphone array, now by delaying the MIC 220*a* closest to the mouth using delay in 814. In this inverse-beam-forming (IBF) configuration, sounds from the mouth are suppressed and a logarithmic gain response depending on the direction angle 854 as shown in FIG. 8 is obtained.

Figure 9:
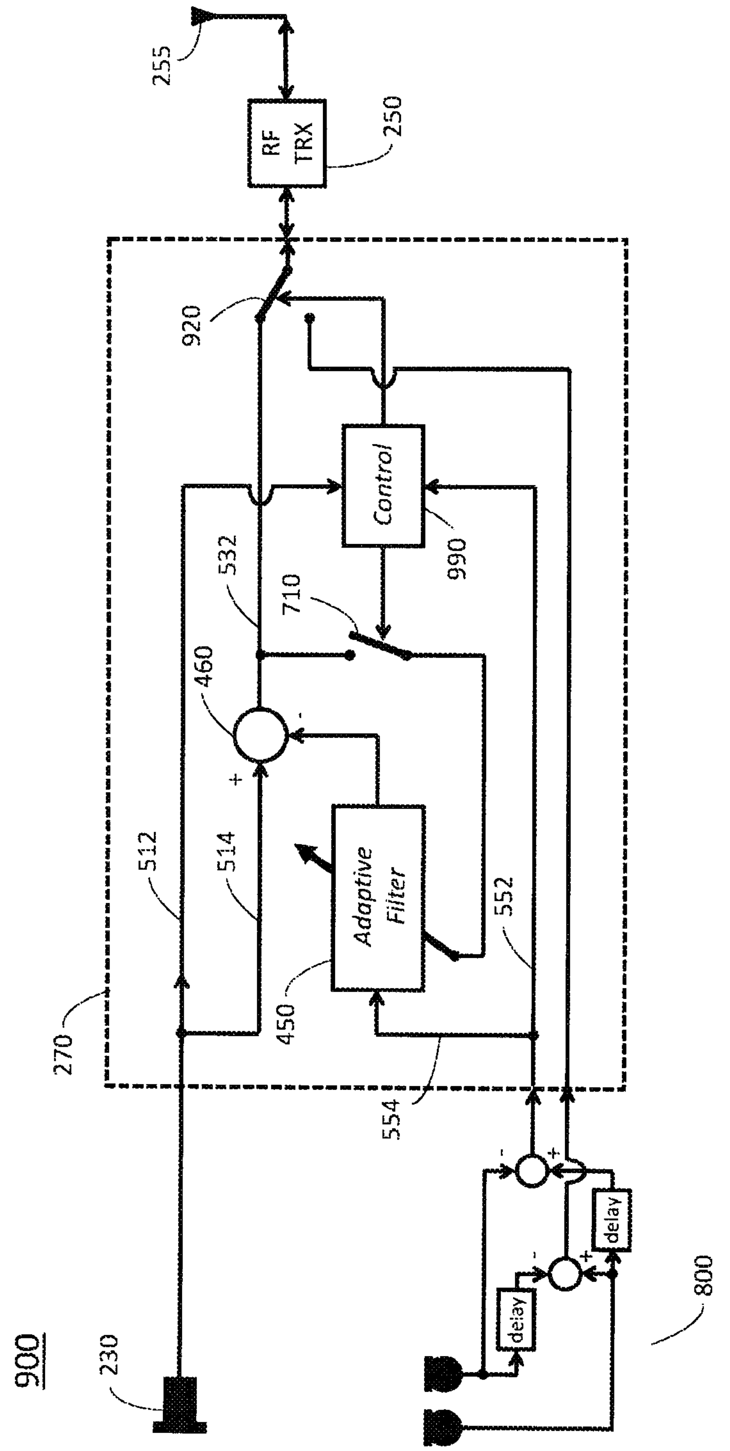
FIG. 9 shows a fourth block diagram using an adaptive filter to suppress environmental noise and a beam-former configuration according to the first and second aspects.

In FIG. 9, an example is shown how the dual-microphone arrangement 800 could combined with the noise suppression arrangement 700. The IBF output of the dual-microphone arrangement 800 is fed into the adaptive filter 450 to cancel the noise in the vibration sensor signal 512. The BF output can also be used, and can be selected at high SNR levels for optimal voice pick-up in silent environments. A control unit 990 is used to control switch 710 to control the updates of the filter coefficients (', and to control switch 920 to select between the system using the vibration sensor with noise cancellation and the dual-microphone beam-forming arrangement.

For the detection of voice and/or noise levels and setting the weight levels in control unit 590 and making switching decisions in control units 790 and 990, several detection methods can be used with analysis in the time and/or in the frequency domain. Control units 590, 790, and 990 use the MIC 220 signal(s) and/or the vibration sensor 230 signal as input to make decisions on combining weights, switch settings, and/or coefficient updates. The simplest way is to consider power levels of the incoming signals. Peak detection and/or root-mean-square methods can be used in the time domain. Alternatively, or in addition, the signals can be mapped into the frequency domain to apply spectral analysis. For example, voice detection can be applied by analyzing the spectral characteristics of the signals and look for voiced components. By spectral analysis, one can also find out whether noise levels are high because of wind noise. Wind noise may not affect the vibration sensor, and should therefore not be subtracted. In that case, the control unit should give maximal weight to the vibration sensor output ($W_A$=1). More complicated circuits may therefore combine the weighted combining shown in FIG. 5 with the variable filter coefficient update shown in FIG. 7. More complex algorithms, some based on Artificial Intelligence, may use analytical techniques in the frequency and/or time domain to identify the sources of sound in the MIC 220 output and vibration sensor 230 output, and separate the voice from the noise. These analyses will be used to have the adaptive filter 450 respond to all kinds of environmental sound except to the headset user's voice.

Figure 10:
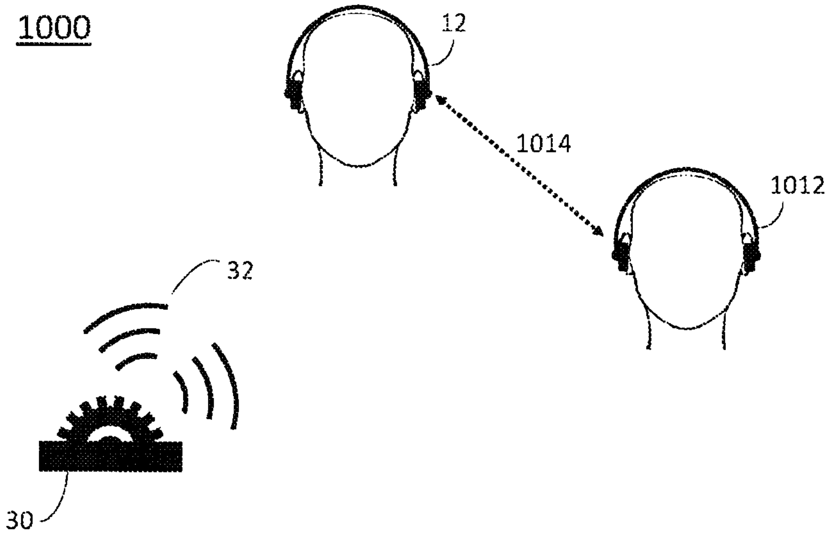
FIG. 10 shows an exemplary use scenario of two or more users located in an area with a high level of environmental sound, the users wearing wireless stereo headsets and wirelessly communicating with each other.

A slightly different use scenario 1000 involving two users is shown in FIG. 10. In addition or instead of a wireless connection from the first user's headset 12 to a host device 12, first user's headset 12 is directly connected via a radio link 1014 to the headset 1012 of a second user. The headset of the first user 12 may or may not have the noise suppression techniques as described in FIGS. 4 and 5. Instead, or in addition, the headset 1012 in the second user may apply the noise suppression techniques as described before using the first user's (noisy) voice signal as input. This requires the users to be located in the same area, exposed to the same loud sounds 32 for example emanating from sawing machine 30. This is the case when a short-range link like Bluetooth® is used for the radio link 1014 between headset 12 and headset 1012.

Figure 11:
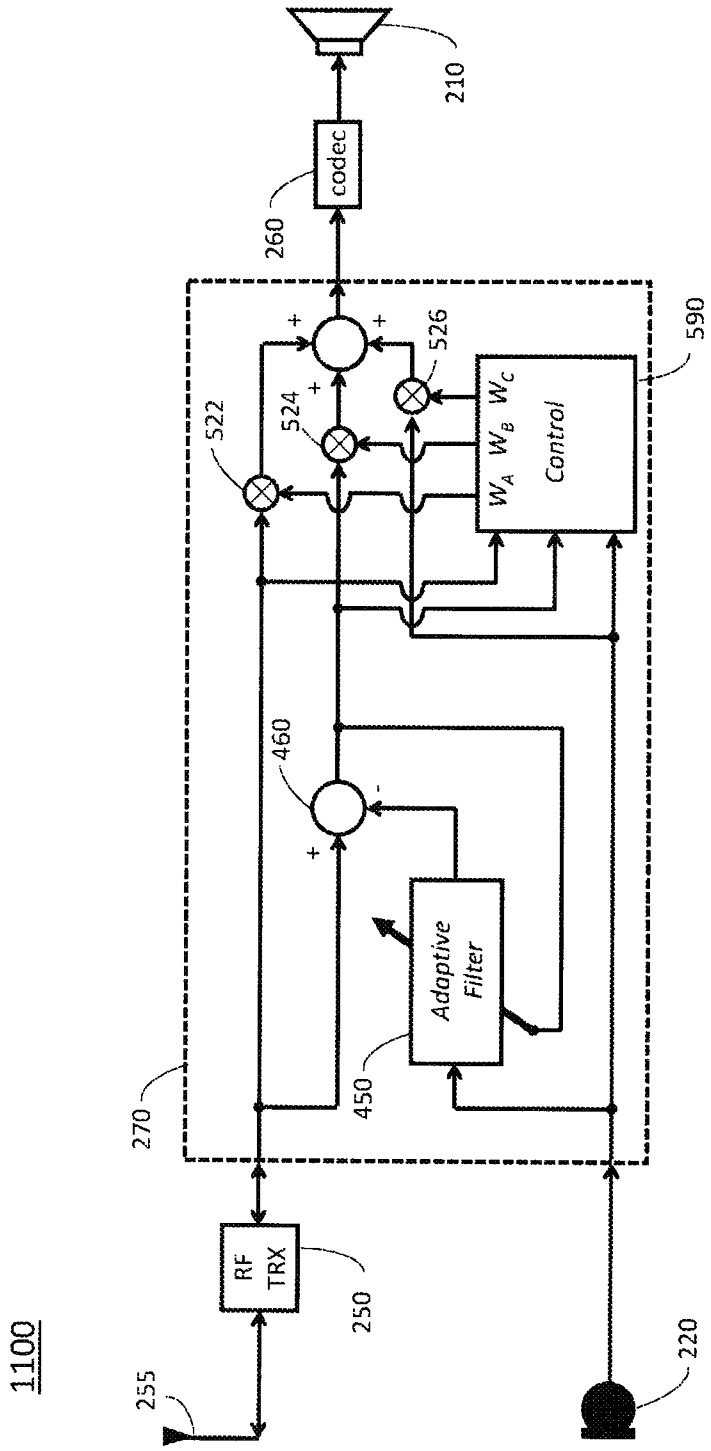
FIG. 11 is a block diagram using an adaptive filter to suppress environmental noise according to a second embodiment.

An arrangement 1100 integrated in the headset 1012 of the second user that can operate both in low SNR and high SNR conditions is shown in FIG. 11. The audio signal of the first user of headset 12 that is picked up via a vibration sensor 230 in headset 12 is not processed by the first user of headset 12 but sent wirelessly via link 1014 to the second user wearing headset 1012. The headset 1012 of the second user will then subtract the noise it picks up with its own air microphone 220 from the audio signal received from headset 12 of the first user. The noise component in the received audio signal sent by headset 12 and picked up by the air microphone 220 residing in headset 12 will be delayed with respect to the noise signal simultaneously picked up by air microphone 220 in headset 1012. The delay will mainly be caused by processing and wireless protocol delay. For example, on the radio link 1014, packetized transmission is used with the audio signal being segmented in frames. Depending on the radio protocol and voice encoding techniques, the frame length may range from 2.5 ms to 20 ms. The adaptive filter 450 will compensate for this delay. It will introduce an extra delay in its impulse response such that its output fed into subtractor 460 is aligned with the delayed audio signal arriving from radio transceiver 250. Usually, a fixed delay is added in front of the FIR arrangement of adaptive filter 450 that takes care of the known delay due to the radio protocol. This will reduce the number of taps in the FIR filter and will speed up the adaptation of filter 450. A Voice Activity Detection (VAD) may be added (not shown) to suppress the second user's own voice picked up by its own headset 1012. As a consequence, when the second user is talking, his own voice will not be produced by speaker 210 in headset 1012. Alternatively, or in addition, the BF and IBF arrangements as shown in FIG. 8 can be applied to suppress the voice of the user wearing headset 1012.

Various operations in the digital domain have been described like adders, subtractors, filters, delays, and so on. Several other audio operations may be added to the embodiments shown in this invention in order to improve the voice pick-up function. For example echo cancellation, active noise cancellation, and other audio enhancement functions may be added and improve the quality of the audio signal once the loud environment noise has been suppressed by the arrangements discussed. Further features may be added to suppress the effect of wind.

All these operations can be carried out in different places in the wireless headset configuration 200 shown in FIG. 2. Some (or all) digital signal processing functionality may be present in the microprocessor 270, in the codec 260, or a separate DSP component (not shown) may be added to the arrangement 200 shown in FIG. 2.

Embodiments of the current invention present numerous advantages over the prior art. When a talker using a headset is present in a noisy environment, combining the sound pickup by an air microphone with a vibration sensor, and using an adaptive filter to suppress environmental noise, the speech quality experienced by a far-end listener is greatly improved. When environmental noise diminishes, the system gradually switches over to voice pickup by a vibration sensor and/or air microphone directly without using the suppression method provided by the adaptive filter. Alternatively, when environmental noise diminishes, the adaptive filter coefficients in filter 450 are not updated anymore, while subtraction of noise still happens in subtractor 460.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for reducing noise in voice pickup in headsets, wherein the method comprises steps of:

generating a first audio signal by picking up sounds using one or more vibration sensors;

generating a second audio signal by picking up sounds using one or more air microphones;

adaptive filtering the second audio signal using an adaptive filter;

monitoring a noise level in the first audio signal and/or the second audio signal;

configuring the adaptive filter based on the monitored noise level;

generating a third audio signal by combining the first audio signal and the second audio signal; and generating an output audio signal by combining the first, second, and third audio signals as a weighted sum, wherein weight factors are applied to the first, second, and third audio signals before summing.

2. The method of claim 1, wherein the step of generating the third audio signal comprises subtracting the second audio signal from the first audio signal to obtain a subtracted output audio signal, the subtracted output audio signal being the third audio signal.

3. The method of claim 2, wherein subtracting the second audio signal from the first audio signal comprises adaptively filtering the second audio signal before subtracting.

4. The method of claim 3, wherein configuring the adaptive filter further comprises configuring the adaptive filter based on the subtracted output audio signal.

5. The method according to claim 1, wherein the monitoring step uses spectral analysis for determining the measured noise level.

6. The method according to claim 1, wherein the step of generating the output audio signal includes using voice detection.

7. The method according to claim 1, wherein the method further comprises a step of:

applying a beam-forming array comprising at least two air microphones configured to suppress a voice component in the second audio signal.

8. The method according to claim 1, wherein the method further comprises a step of wirelessly sending the first audio signal to a wireless headset.

9. The method of claim 1, wherein the method further comprises:

determining the weight factors depending on the monitored noise level.

10. A headset comprising:

one or more vibration sensors arranged to pick up sounds to generate a first audio signal;

one or more air microphones arranged to pick up sounds to generate a second audio signal;

an adaptive filter arranged to adaptively filter the second audio signal;

a noise level sensor arranged to obtain a noise level signal;

a microprocessor configured to generate a third audio signal by combing the first and second audio signals and to generate an output audio signal by combining the first, second, and third audio signals as a weighted sum, wherein weight factors are applied to the first, second, and third audio signals before summing, wherein the microprocessor is further configured to configure the adaptive filter based on the noise level signal.

11. The headset of claim 10, wherein the headset is a wireless headset.

12. The headset of claim 10, wherein the microprocessor is arranged as a subtractor for subtracting the second audio signal from the first audio signal to obtain a subtracted output audio signal, the subtracted output audio signal being the third audio signal.

13. The headset of claim 12, wherein the adaptive filter is further arranged to adaptively filter the second audio signal fed to the subtractor, and wherein the adaptive filter is based on the subtracted output audio signal.

14. The headset of claim 12, wherein the microprocessor is arranged to combine the subtracted output audio signal with the first audio signal and/or second audio signal dependent on the noise level signal.

15. The headset of claim 10, wherein the headset further comprises a beam-forming array comprising at least two air microphones configured to suppress a voice component in the second audio signal.

16. The headset of claim 13, wherein the headset further comprises a noise level sensor arranged to obtain a noise level signal, and-wherein the adaptive filter adapts its coefficients dependent on the noise level signal.

17. The headset of claim 12, wherein the headset comprises a radio transceiver for wireless communication of the subtracted output audio signal to an external device.

18. The headset of claim 17, wherein the radio transceiver is based on Bluetooth®.

* * * * *